Patented Sept. 22, 1942

2,296,405

UNITED STATES PATENT OFFICE 2,296,405

PRODUCTION OF HYDROCARBONS

Arno Scheuermann and Eugen Marecek, Ludwigshafen-on-the-Rhine, Germany; vested in the Alien Property Custodian No Drawing. Application March 7, 1940, Serial No. 322,768. In Germany March 25, 1939

6 Claims. (Cl. 260—449)

The present invention relates to the production of hydrocarbons from carbon monoxide and hydrogen.

It is known that the production of hydrocarbons containing more than one carbon atom by conversion of carbon monoxide with hydrogen can be carried out under atmospheric or higher pressures in the presence of catalysts containing metals of the iron group or their compounds or mixtures of these metals or compounds. These catalysts are preferably employed on carriers, such as diatomaceous earth, and usually with additions of activating or stabilizing substances. For the preparation of catalysts containing more than one metal of the iron group these metals are usually precipitated simultaneously in the form of readily reducible compounds from a solution of their salts, the precipitate being subsequently subjected to a reducing treatment.

We have now found that very good yields of solid and liquid hydrocarbon products are obtained in the said conversion of carbon monoxide with hydrogen when employing catalysts, containing iron and nickel, which have been prepared by slowly precipitating reducible iron and nickel compounds from a solution of salts of the said metals at a temperature of 40° C. or below, preferably below 30° C., while maintaining a pH-value of not less than 8 in the solution during the precipitation.

The said slow precipitation is advantageously effected in such a manner that it takes more than 3 hours, for example, 12 hours or more. The addition of the mixed solution of the metal salts to the solution of the precipitating agent is preferably carried out slowly and continuously in small amounts, for example drop by drop and at room temperature while the solution is advantageously agitated, for example by stirring.

The iron-nickel-precipitate obtained is, if desired after heating to boiling temperature for a short time, washed and then dried, for example, at 110° C. while exposed to the air or in a stream of carbon dioxide or of other inert gases.

The catalysts prepared according to the present invention may also contain activators, such as aluminum oxide, magnesium oxide or other metal oxides which are not reduced under the conversion conditions. These activators may be added in various amounts. In case the reduction of the catalysts becomes more difficult due to the addition of substantial amounts of activating substances, this may be compensated by adding silver or its compounds before or after the precipitation of the catalyst. The good results obtained by the slow precipitation at the said pH-values is particularly pronounced with catalysts, containing activators, which are free from carriers. Improved results are, however, also obtained when employing catalysts on carriers, such as for example diatomaceous earth.

The ratio of iron to nickel contained in the present catalysts may vary within wide limits; preferably not more than 2 mols of iron for each mol of nickel are employed.

The catalysts prepared according to the present invention are very voluminous and the filling weight of the said catalysts or their bulk density is much smaller than that of catalysts having the same composition but which have been prepared in the usual manner by rapid precipitation. The present invention thus presents the advantage of a considerably smaller amount by weight of the catalytic metal being required for the same catalyst space. The bulk density of the said catalysts is also much smaller than that of catalysts obtained by a slow precipitation in the inverse way, namely by adding the precipitating agent drop by drop to the solution of the iron and nickel salts. For example, the ratio of the bulk density of an iron-nickel-aluminum oxide catalyst (molal proportion of the constituents 1:1:0.2), prepared according to the present invention from a solution of the nitrates of the said metals by gradually adding the same to a solution of an alkali metal carbonate, to the bulk density of a catalyst which has also been prepared by a slow precipitation from a similar solution of the said nitrates, but in the inverse way by adding the carbonate solution drop by drop to the solution of the nitrates, is 1:3.5 (when substituting magnesium oxide for the aluminum oxide this ratio is 1:3). Though with the catalysts prepared according to the present invention only about one third of the amount by weight of the active metallic component is required as compared with catalysts prepared in the inverse way, the yield of solid and liquid hydrocarbons per cubic meter of the carbon monoxide-hydrogen mixture is in both cases about 90 grams. Furthermore with the present voluminous catalysts the danger of local overheating of the catalyst is considerably reduced and consequently the operation is much simpler.

With the catalysts prepared according to the present invention the operation may be continued for a period of several weeks, without the activity of the catalyst being reduced to a substantial extent, for example by 10 per cent of its maximum value.

If after extended periods of operation the said catalysts have suffered a reduction in their activity they may be regenerated by operations known per se, for example, by treatment with hydrogen or by extraction with solvents.

The conversion of the carbon monoxide with hydrogen according to the present process may be carried out at temperatures between 160 and 250° C., advantageously between 190 and 220° C., however, also higher temperatures, for example, 300° C. or thereabove, and lower temperatures, for example, 150° C., come into consideration. The pressure employed may be atmospheric pressure or thereabout, but also higher pressures, for example 10, 20, 50 or 100 atmospheres or more, may be used.

The following example will further illustrate the nature of the present invention, and how the same can be carried out in practice, but it should be understood that the invention is not limited to said example.

*Example*

9 liters of an aqueous solution containing 725 grams of iron nitrate $Fe(NO_3)_3.9H_2O$, 480 grams of nickel nitrate $Ni(NO_3)_2.6H_2O$ and 268 grams of aluminum nitrate $Al(NO_3)_3.9H_2O$ are allowed to flow drop by drop in the course of 48 hours into 9 liters of an aqueous solution containing 1010 grams of potassium carbonate. The whole is then heated and kept at boiling temperature for 5 minutes. The precipitate formed is separated by filtration, washed with water and then dried in the air at 110° C.

50 cubic centimeters of the unreduced catalyst containing 5.6 grams of iron and nickel, are thereupon reduced with hydrogen at 350° C. for 5 hours. After having lowered the temperature to 190° C. a synthesis gas containing carbon monoxide and hydrogen in the ratio 1:2 is passed over the catalyst so obtained at a rate of 4 liters per hour. During a period of several weeks a yield of 90 grams of liquid and solid conversion products per cubic meter of the carbon monoxide-hydrogen mixture is obtained. After an operation of 6 weeks the catalyst has not yet lost 10 per cent of its activity.

About the same yield is obtained with catalysts having substantially the same composition but which have been prepared in another manner; however, a considerably larger amount of iron and nickel is required in the latter case. The bulk density of a catalyst which has been obtained by slow precipitation in the inverse way, that is by adding the potassium carbonate solution drop by drop to the solution of the iron-nickel-aluminum nitrate, is 3.5 times as high, so that about 20 grams of iron and nickel would be required for the same catalyst space.

The bulk density of a catalyst prepared by a more rapid precipitation, say within a few minutes, is still higher, so that with such a catalyst 25 grams of iron and nickel are needed for the same catalyst space.

We claim:

1. A process for the conversion of carbon monoxide with hydrogen into hydrocarbons containing more than one carbon atom in the presence of a catalyst containing iron and nickel, which comprises employing a catalyst prepared by slowly precipitating reducible iron and nickel compounds from a solution of salts of the said metals, at a temperature below 40° C. while maintaining a pH-value of not less than 8 in the solution during the precipitation.

2. In the process as claimed in claim 1, carrying out the precipitation in such a manner that it takes more than 3 hours.

3. In the process as claimed in claim 1, precipitating the catalyst at a temperature below 30° C.

4. The process as claimed in claim 1, in which the catalyst contains as an activator a metal oxide which is not reduced under the conversion conditions.

5. The process as claimed in claim 1, in which the catalyst contains aluminum oxide as an activator.

6. A process for the production of hydrocarbons containing more than one carbon atom by passing a mixture of carbon monoxide and hydrogen over a catalyst containing iron, nickel, silver and an activating metal oxide which is not reduced under the reaction conditions which comprises preparing the catalyst by slowly precipitating reducible iron and nickel compounds from a solution of salts of the said metals at a temperature below 40° C. maintaining a pH-value of not less than 8 during the precipitation and incorporating with the precipitate a substantial amount of said activating metal oxide and silver.

ARNO SCHEUERMANN.
EUGEN MARECEK.